United States Patent

Ezaki

[15] 3,641,521

[45] Feb. 8, 1972

[54] MAGNETIC-CORE MEMORY MATRIX

[72] Inventor: Joichiro Ezaki, Chiba-ken, Japan

[73] Assignee: TDK Electronics Company Ltd., Tokyo, Japan

[22] Filed: Aug. 25, 1969

[21] Appl. No.: 852,809

[30] Foreign Application Priority Data

Aug. 30, 1968 Japan ..................................43/74828

[52] U.S. Cl. ...............340/174 BA, 340/174 M, 340/174 DC
[51] Int. Cl. .....................................G11c 5/02, G11c 11/06
[58] Field of Search................................340/174 M, 174 DC

[56] References Cited

UNITED STATES PATENTS 3,155,942 11/1964 Hoover .................................340/174

*Primary Examiner*—James W. Moffitt
*Attorney*—Burgess, Ryan and Wayne

[57] ABSTRACT

A magnetic-core memory matrix formed in such a manner that the spacing between the adjacent drive windings parallel with the sense winding is made larger than the spacing between the adjacent drive windings not parallel with the sense winding, thereby eliminating the noise produced in the sense windings due to the inducing voltage from the adjacent parallel drive windings.

1 Claims, 2 Drawing Figures

MAGNETIC-CORE MEMORY MATRIX

BACKGROUND OF THE INVENTION

THe present invention relates to a magnetic-core memory matrix for electronic computers and more particularly threading of drive and sense windings of a magnetic-core matrix.

As shown in FIG. 1 in a conventional magnetic-core matrix, cores $C_{11}$, $C_{12}$ and so on are arrayed so as to be disposed at the intersections of Y-drive windings $Y_1$, $Y_2$ and so on and X-drive windings $X_1$, $X_2$ and so on, and the sense windings S–*Sa* are extended in parallel with either of the X- or Y-drive windings (for example Y-drive windings in FIG. 1). The spacing between the adjacent magnetic-cores threaded on a network of various windings is all equal.

When the spacing is reduced in order to shorten the sense windings or to reduce in size the whole construction of a magnetic-core matrix, the noise is produced by the induction from the adjacent Y-drive windings in the sense windings. That is, the sense windings experience not only the induction from the Y-drive winding $Y_3$ but also those from the Y-drive windings $Y_2$ and $Y_4$ so that the noise is produced.

In view of the above, the primary object of the present invention is to provide a relatively small-sized magnetic-core matrix producing less noise.

Another object of the present invention is to provide a magnetic-core memory matrix in which both of the drive windings and the sense windings may be readily passed through the cores.

SUMMARY OF THE INVENTION

In brief, the present invention provides a magnetic-core memory matrix in which the spacing between the adjacent magnetic cores in the direction in which only the drive windings are extended is made larger than that in the direction in which both of the drive and sense windings are extended.

According to the present invention the spacing between the adjacent magnetic cores threaded on the drive winding extending in parallel with the sense windings is made larger as described above, the noise due to the induction described above will be eliminated. The sense windings experience no induction from the drive windings extending at right angles relative to the sense windings so that the spacing between the adjacent cores threaded on these drive windings may be sufficiently reduced. Thus, threading of the drive windings in parallel with the sense windings is much facilitated.

The above and other objects, features and advantages of the present invention will become more apparent from the following description of the conventional magnetic-core memory matrix and that of the present invention with reference to the accompanying drawing.

DESCRIPTION OF THE PREFERRED EMBODIMENT

Figure 1:
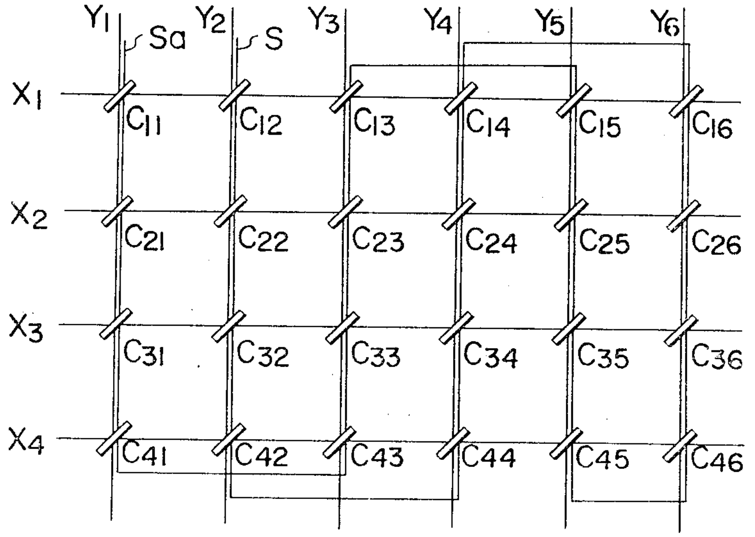
FIG. 1 PRIOR ART
FIG. 1 is a magnetic-core memory matrix according to the prior art.
Figure 2:
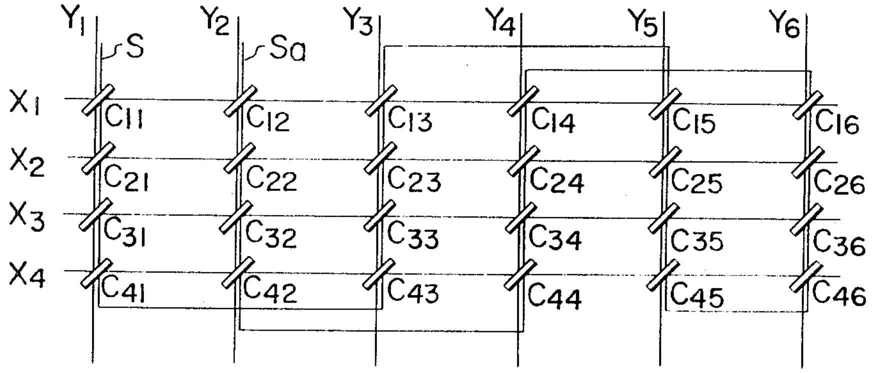
FIG. 2 is one illustrative embodiment of the present invention.

Referring to FIG. 2, magnetic cores $C_{11}$, $C_{12}$ and so on are arrayed on a network of X- and Y-drive windings $X_1$, $X_2$ and so on and $Y_1$, $Y_2$ and so on at the intersections thereof. A sense winding S–*Sa* is extending in parallel with the Y-drive windings. The spacing between the adjacent magnetic cores in the X-drive winding direction is larger than that in the Y-drive winding direction. For example, the spacing between the magnetic cores $C_{24}$ and $C_{25}$ is 2.5 times as much as that between the magnetic cores $C_{24}$ and $C_{34}$.

What is claimed is:

1. A magnetic-core memory matrix comprising a plurality of cores arranged in rows and columns, a plurality of row drive windings passing through said cores and a plurality of column drive windings passing through said cores, sense windings passing through said cores and being parallel to said column drive windings, said column drive windings being spaced apart a distance of at least 2.5 times greater than said row drive windings.

* * * * *